United States Patent
Geurts

[15] 3,642,074
[45] Feb. 15, 1972

[54] EARTH-WORKING IMPLEMENT

[72] Inventor: Cletus J. Geurts, Box 45, Graceville, Minn. 56240

[22] Filed: Sept. 13, 1965

[21] Appl. No.: 486,712

[52] U.S. Cl. .............................................. 172/261, 172/265
[51] Int. Cl. .............................................................. A01b 61/00
[58] Field of Search ..................... 172/261, 264, 269; 267/64

[56] References Cited

UNITED STATES PATENTS

| | | | |
|---|---|---|---|
| 3,032,122 | 5/1962 | Geurts | 172/264 |
| 3,042,122 | 7/1962 | Anderson | 172/265 |
| 3,062,330 | 11/1962 | Lyon | 267/64 X |
| 3,349,855 | 10/1967 | Knudson | 172/261 |

Primary Examiner—Robert E. Bagwill
Attorney—Burd, Braddock & Bartz

[57] ABSTRACT

A hydraulically operated automatic plow bottom holding, release and return mechanism connecting a plow bottom to a beam of the plow frame. The mechanism has an articulated linkage coacting with a guide means to control the upward movement of the plow bottom against the hydraulic force of a cylinder so that when the plow bottom strikes an obstruction the point moves rearwardly and upwardly without going below the plowing depth. The cylinder returns and holds the plow bottom in its ground-working position.

12 Claims, 8 Drawing Figures

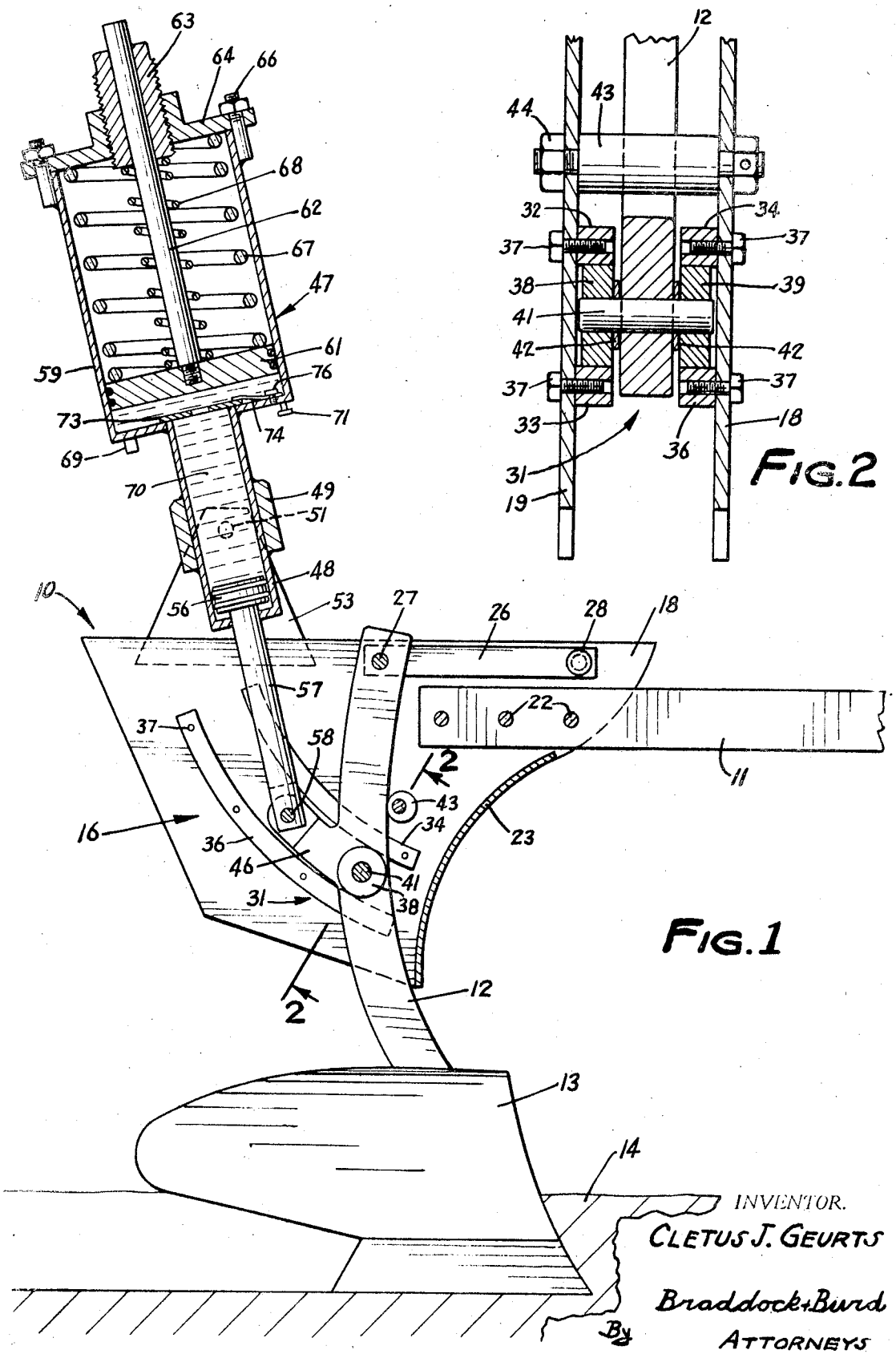

INVENTOR.
CLETUS J. GEURTS
BY
Braddock+Burd
ATTORNEYS

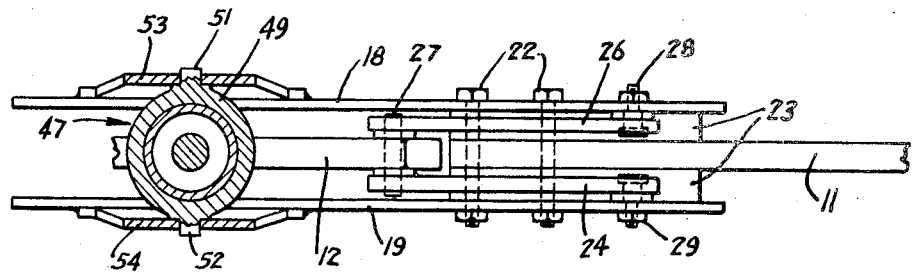
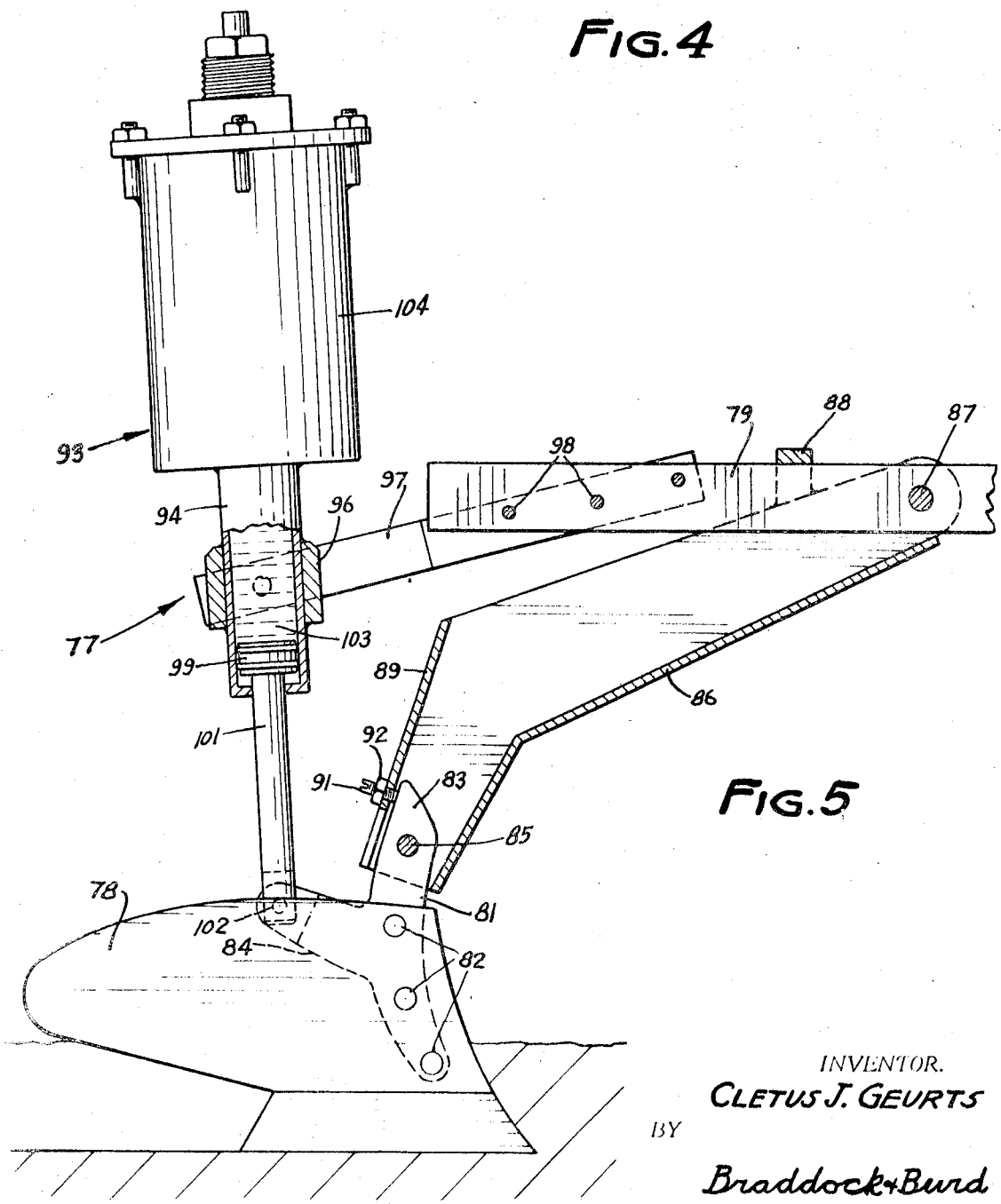

INVENTOR.
CLETUS J. GEURTS
BY
Braddock+Burd
ATTORNEYS

EARTH-WORKING IMPLEMENT

This invention relates to an earth-working implement and more particularly to an automatic holding and release mechanism for a plow bottom to prevent the plowshare from breaking, bending or other injury when striking an obstruction.

It is the object of the invention to provide an improved load holding and release mechanism for the ground-working tool of an earth-working implement, such as a plow, lister, cultivator and the like.

Another object of the invention is to combine with a plow a load holding and release mechanism which allows the plow standard to swing rearwardly and upwardly out of the ground without the plow point going below the plowing depth when the plowshare strikes a fixed object as a stone or the like.

Another object of the invention is to provide a plow bottom holding and release mechanism which will yield when the plow bottom hits an object only to the degree necessary to clear the object whereby unplowed areas of a field are kept to a minimum.

A further object of the invention is to provide a release mechanism for a plow bottom which will automatically reset without stopping the forward movement of the plow.

Still another object of the invention is to provide a plow with an automatic load release mechanism for the plow bottom which can be used in conjunction with a tractor without a hydraulic pressure system.

An additional object of the invention is to provide a plow bottom holding and release mechanism having a minimum number of parts and which is economical in cost and maintenance, and reliable and efficient in use.

These and other objects and advantages will become apparent from this disclosure.

A few of the many possible embodiments of the invention are illustrated in the accompanying drawing in which:

FIG. 1 is a side elevational view of a plow bottom in ground-working position attached to a beam by the holding and release mechanism, shown in section, of this invention;

FIG. 2 is an enlarged sectional view taken along the line 2—2 of FIG. 1;

FIG. 4 is a sectional view taken along the line 4—4 of FIG. 3;

FIG. 5 is a side elevational view of a plow bottom in ground-working position attached to a beam with a modified holding and release mechanism shown partly in section;

Figure 3:
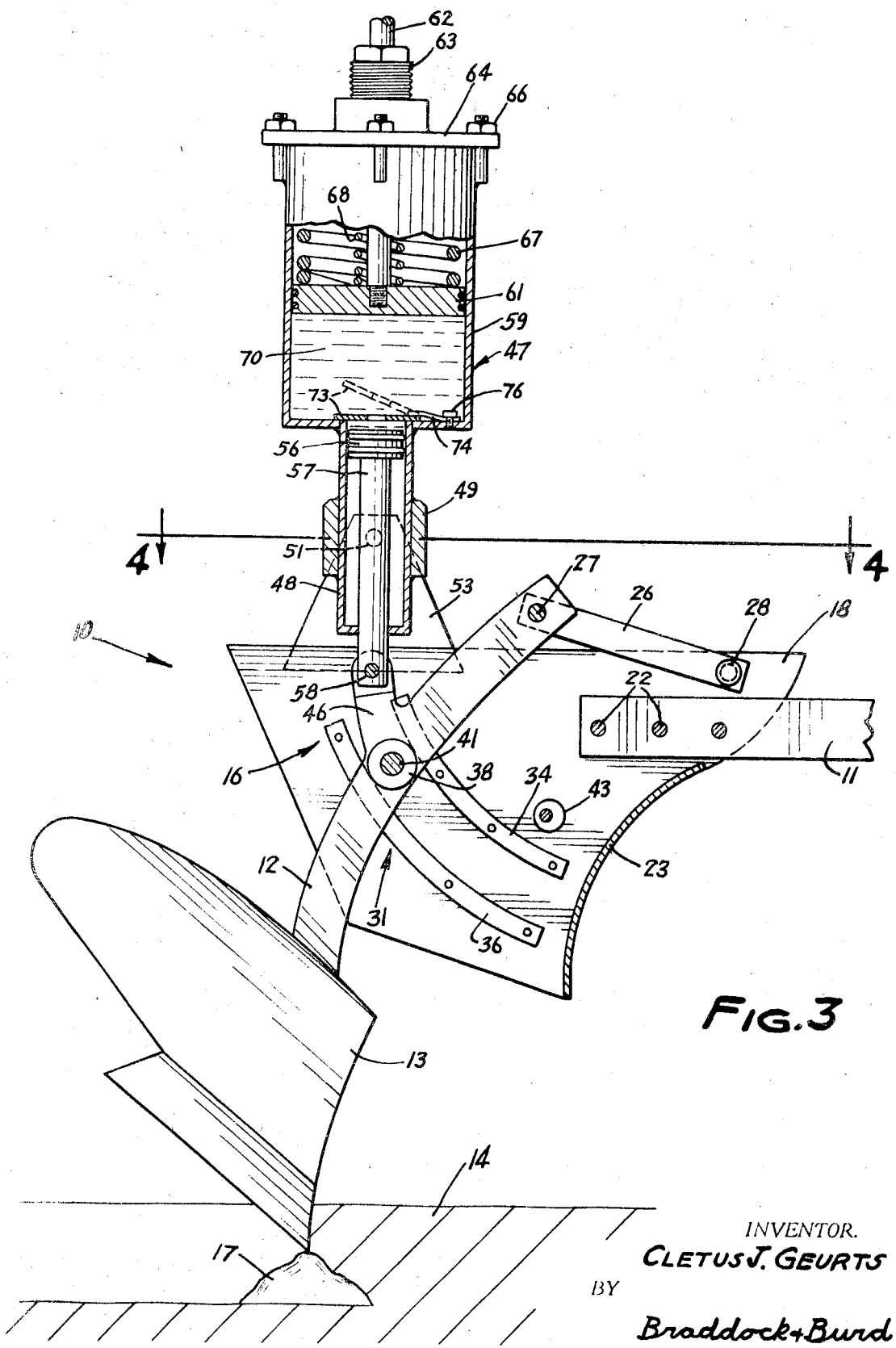
FIG. 3 is a view similar to FIG. 1 showing the plow bottom in the release position.

Referring to the drawings, there is shown in FIG. 1, a portion of a conventional moldboard plow indicated generally at 10 including a horizontal longitudinal plow beam 11, and an upright standard 12 secured at its lower end to an earth-working tool or plow bottom 13 positioned in soil 14. The plow bottom 13 is shown in ground-working position. A holding and release mechanism indicated generally at 16 attaches the standard 12 to the beam 11. The mechanism 16 yieldably holds the plow bottom 13 in ground working position shown in FIG. 1. When the plowshare strikes an obstruction 17, such as rock shown in FIG. 3, the plow bottom moves rearwardly and upwardly to a release or trip position permitting the plowshare to ride over the obstruction. Mechanism 16 allows the plow bottom 13 to swing rearwardly and upwardly out of the ground without the share point going below the plowing depth. After the plowshare has passed over the obstruction mechanism 16 automatically resets the plow bottom 13 to the earth-working position. This is accomplished without stopping the forward movement of the plow.

The holding and release mechanism 16 has a support comprising a pair of upright plates 18 and 19 located on opposite sides of the rear end section of the horizontal beam 11. As shown in FIG. 4, blocks 21 space the plates 18 and 19 from the adjacent sides of the beam. Nut and bolt assemblies 22 are used to secure the plates 18 and 19 and spacer blocks 21 to the beam. The front edge of the plates 18 and 19 curves downwardly and rearwardly and is reinforced by a transverse web 23. The plates 18 and 19 project rearwardly from the end of the beam 19 on opposite sides of the upright standard 12. The standard 12 curves forwardly in a downward direction. The lower end of the standard 12 is secured by bolts (not shown) to plow bottom 13. The upper end of the standard 12 is pivotally connected to a pair of links 24 and 26 by a transverse pin 27 projected through the standard and the ends of the links. The opposite ends of the links are pivoted to the plates 18 and 19 by nut and bolt assemblies 28 and 29, respectively.

The standard 12 is positioned for movement in an upward and rearward direction between the plates 18 and 19. The path of this movement is determined by guide apparatus indicated generally at 31. Secured to the inner faces of the plates 18 and 19 are two pair of upper and lower arcuate track members 32, 33 and 34, 36, respectively. As shown in FIG. 2, bolts 37 extend through the plates 18 and 19 and into the track members to fix the track members to the plates. The space between each pair of track members defines an arcuate way accommodating rollers 38 and 39 rotatably positioned on a transverse pin 41 projected through the standard 12. Washers 42 provide clearance spaces between the sides of the standard 12 and the rollers 38 and 39. The radius of curvature of the track members 32, 33, 34 and 36 is about equal to the distance between the midportions of each track member and the axes of the nut and bolt assemblies 28 and 29. The radial center of the arcuate track members is upwardly and rearwardly of the axes of the nut and bolt assemblies 28 and 29. The track members have an arcuate length which is equal to about one-eighth of a circle.

When the plow bottom 13 is in the ground-working position, shown in FIG. 1, the standard 12 abuts a stop 43 extended transversely between the plates 18 and 19. The stop 43 is an eccentric bolt having a nut 44 which can be adjusted to vary the working angle of the plowshare and thereby change the pull or suction of the plow bottom 13 as it moves through the soil.

As shown in FIG. 1, the midportion of the standard 12 has a rearwardly and upwardly projected arm 46 pivoted to a power unit, indicated generally at 47, which biases the standard 12 into engagement with the stop 43 thereby yieldably holding the plow bottom 13 in the ground-working position.

The power unit 47 in addition to biasing the plow bottom 13 in the ground-working position functions to absorb and store energy transmitted thereto when the plow bottom strikes an obstruction as shown in FIG. 3. The power unit 47 comprises a first cylinder 48 secured to a collar 49. As shown in FIG. 4, the collar 49 has oppositely projected ears 51 and 52 extended through holes in top sections of upright plates 53 and 54 secured to the plates 18 and 19, respectively. The collar 49 positions the cylinder 48 between the plates 53 and 54 for pivotal movement about a horizontal transverse axis.

Slidably disposed in the cylinder 48 is a piston 56 secured to a downwardly projected piston rod 57. Cylinder 48, piston 56 and piston rod 57 are commonly known as a hydraulic ram. The lower end of the piston rod 57 is pivotally connected to the outer section of the arm 46 by a transverse pin 58 projected through suitable holes in the end of the piston rod 57 and the arm 46. A large cylinder 59 positioned concentrically with the cylinder 48 is secured, to the upper end of the cylinder 48. The cylinder 48 is open to the bottom of the cylinder 59. Slidably positioned in the cylinder 59 is a piston 61 secured to an upwardly projected piston rod 62. The piston rod 62 slidably projects through a sleeve 63 threaded into a top closure 64 secured to the upper end of the cylinder 59 by fasteners 66, such as stud and nut units. Positioned within the cylinder and in bearing engagement with the top of the piston 61 and the closure member 64 is a large spring 67 which biases the piston 61 in a downward direction. Concentrically positioned about the piston rod 62 is a small spring 68 engageable at opposite ends with the piston 61 and the sleeve 63. The compression force of the spring 68 may be adjusted by turning the sleeve 63 relative to the closure member 64. The bottom of the cylinder 59 has a filler coupler 69 used to fill the portions of the cylinders 48 and 59 between the pistons 56 and 61 respectively with hydraulic fluid 70, such as oil. The cylinder 59 also has a bleed cock 71 used to bleed air from cylinder 59.

The flow of hydraulic fluid from cylinder 48 to cylinder 59 is regulated by a one-way flow restrictor washer 73 having a central hole permitting a restricted flow of fluid from the cylinder 59 to the cylinder 48. The washer 73 is biased into engagement with the top of the cylinder 48 by a leaf spring 74 secured at one edge to washer 73 and secured at an opposite edge to the base of the cylinder 59 by screw 76.

In use, as shown in FIG. 1, the power unit 47 yieldably holds the plow bottom 13 in the soil-working position. The force of the springs 67 and 68 urge the large piston 61 against the hydraulic fluid 70. This force is multiplied by using the smaller piston 56 which is in fluid engagement with the fluid 70. The pistons 56 and 61 are fluidly coupled to each other to transmit the force of the springs 67 and 68 to the standard 12. The piston rod 57 acting on the arm 46 pivots the standard 12 about the pivot pin 27 and pivots the links 24 and 26 about the pivot bolts 28 and 29 forcing the standard 12 into engagement with the stop 43.

As shown in FIG. 3, when the plowshare strikes an obstruction 17, such as a rock and the like, the force on the plow bottom 13 and standard 12 exceeds the holding force of the power unit 47 pushing the standard 12 upwardly and rearwardly driving the piston 56 into the cylinder 48. This forces the hydraulic fluid 70 past the open flow restrictor washer 73 as shown in broken lines in FIG. 3 into the large cylinder 59. The hydraulic fluid in the large cylinder 59 raises piston 61 against the biasing force of the springs 67 and 68. The large cylinder acts as an accumulator for storing hydraulic fluid under pressure.

The standard 12 is guided arcuately in an upward and rearward direction by the guide apparatus 31. This causes the standard 12 to pivot rearwardly about pin 27 as well as move the standard 12 in an upright direction about the pivot axes of the bolts 28 and 29. The plow bottom 13 immediately moves upwardly and rearwardly when it strikes an obstruction. The plow share point does not go below normal plowing depth.

After the plowshare has passed over the obstruction 17 the power unit 47 automatically forces the plow bottom 13 in a forward direction to the earth-working position shown in FIG. 1. Movement of the fluid from the cylinder 59 to the cylinder 48 is restricted by the washer 73 to prevent a fast snap or kick of the plow bottom 13 to the earth-working position. The plow bottom 13 will automatically move to the earth-working position without impeding or stopping the forward motion of the plow. The standard 12 is guided by the rollers 38 and 39 along the arcuate ways defined by the track members 32, 33 and 34, 36 until the standard 12 abuts against the stop 34.

Referring to FIG. 5, there is shown a modified holding and release mechanism indicated generally at 77 for operatively attaching a plow bottom 78 to a horizontal plow beam 79. The mechanism 78 comprises an upright standard 81 secured by bolts 82 to plow bottom 78. The standard 81 has an upright arm 83 and a rearwardly directed arm 84. A transverse pin 85 pivotally connects the upright arm 83 to an angle frame 86 having the shape of an upwardly open channel. The forward upper end of the frame 86 extends on opposite sides of the beam 79 and is pivotally connected thereto by a horizontal transverse pin 87. Angular movement of the frame 86 in a forward direction is limited by an inverted U-shaped stop 88 secured to opposite sides of the frame 86 and extended over the plow beam 79. The rear lower end of the frame 86 is enclosed and reinforced by a transverse web 89. A bolt 91 threaded through a nut 92 secured to the lower end of the web 89 functions as an adjustable stop for the standard 81. The bolt 91 projects through the web 89 and engages the rear side of the upright arm 83.

The plow bottom 78 is yieldably held in the ground-working position by a power unit 93 which is identical to the power unit 47. The power unit 93 includes upright cylinder 94 secured to a collar 96 having a pair of ears pivotally mounting the collar on a pair of brackets 97 secured to the end of the beam 79 by bolt and nut assemblies 98. The brackets 97 are projected rearwardly and downwardly from the beam 79 on opposite sides of the collar 96. Slidably positioned in the cylinder 94 is a piston 99 attached to a downwardly directed piston rod 101. A transverse pin 102 pivotally connects the lower end of the piston rod 101 to the rearward arm 84 of the standard. Hydraulic fluid 103 under pressure urges the piston 99 in a downward direction moving the standard 81 in an upright position with the arm 83 in engagement with the end of the stop bolt 91 and the stop 88 into engagement with the top of the plow beam 79. Adjustment of the bolt 91 changes the angular position of the plowshare to adjust the downward pull or suction of the plow bottom.

The hydraulic fluid 103 is placed under high pressure in a large cylinder 104 which is multiplied by using small piston 99. Cylinder 104 serves as an accumulator for the hydraulic fluid subjected to a compressive force by a spring-biased piston. The hydraulic fluid may be subjected to the force of compressed gas.

When the plow bottom 78 strikes an obstruction standard 81 will pivot about the transverse pin 85 and frame 86 will pivot upwardly about the transverse pin 87. This forces the piston 99 into the cylinder 94 forcing the hydraulic fluid 103 upwardly into the large cylinder 104. After the plow bottom 78 has passed over the obstruction the pressure on the hydraulic fluid 103 forces the piston 99 in a downward direction moving the plow bottom and standard 81 to the ground-working position as shown in FIG. 5.

Figure 6:
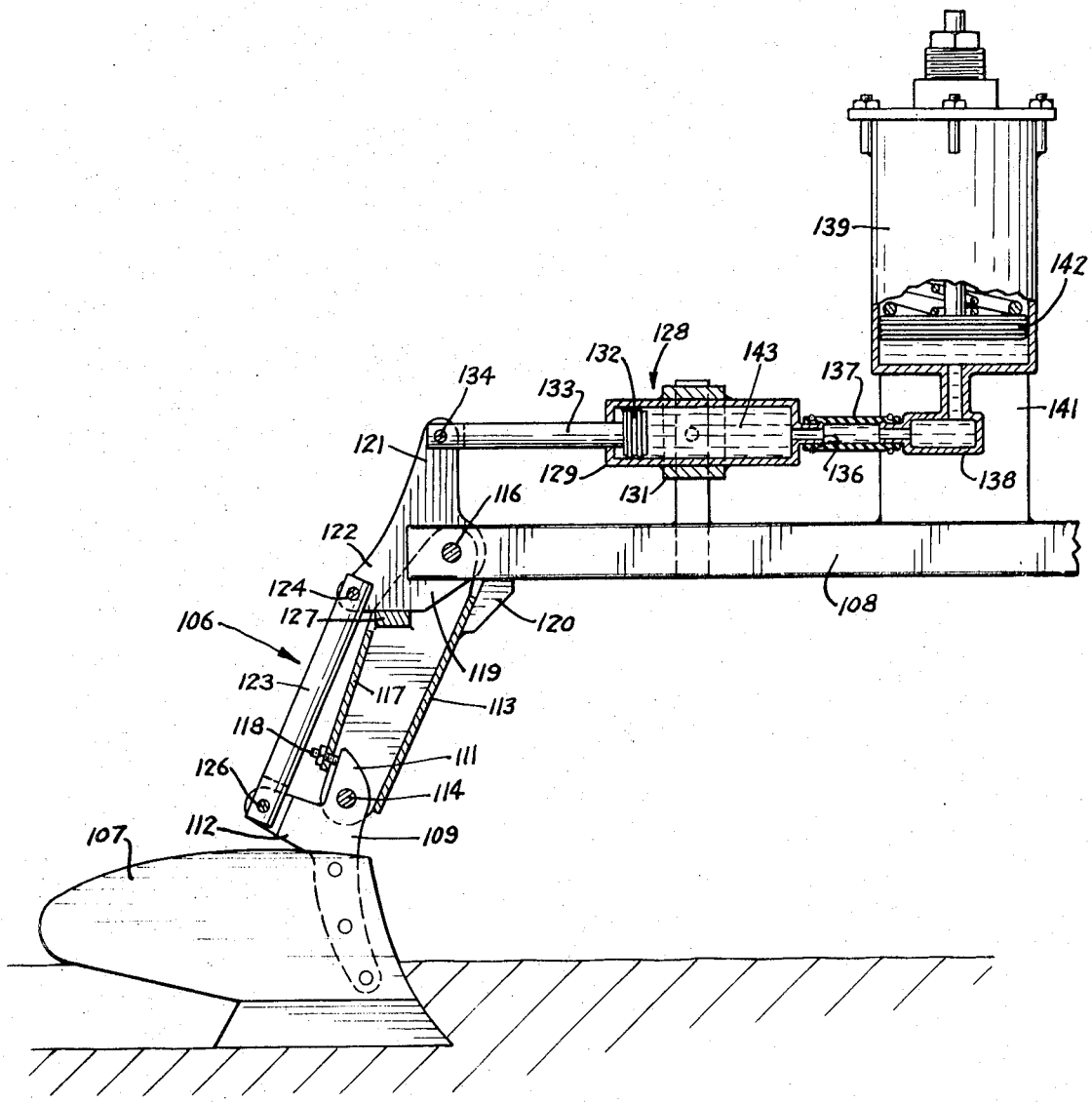
FIG. 6 is a view similar to FIG. 5 showing a further modified holding and release mechanism, shown partly in section, securing a plow bottom to a beam.

Referring to FIG. 6, there is shown another modified holding and release mechanism indicated generally at 106 for securing a plow bottom 107 to a horizontal plow beam 108. Holding mechanism 106 comprises an upright standard 109 having an upright arm 111 and a rearward arm 112. A channel-shaped frame 113 pivotally connects the standard 109 to the end of the beam 108. The frame 113 opens in a rearward direction and is positioned about opposite sides of the upright arm 111. A transverse pin 114 pivotally connects the arm 111 to the frame 113. The upper end of the frame 113 extends on opposite sides of the beam 108 and is pivoted thereto by a transverse pin 116. The frame 113 is reinforced with an upright web 117 carrying an adjustable stop 118 which bears against the rear side of the upright standard arm 111. An upright gusset plate 120 secured to the front side of the frame 113 is engageable with the bottom of the beam 108 to limit forward movement of the frame 113. The gusset plate 120 may be secured to the beam 108.

Positioned adjacent one side of the beam 108 and pivotally mounted on the transverse pin 116 is a bellcrank 119 having an upright arm 121 and a rearward arm 122. One end of a link 123 is pivoted by a transverse pin 124 to the rearward arm 122 and pivoted at its opposite end to the rearward standard arm 112 by a transverse pin 126.

The bellcrank 119 is held against a stop 127 secured to the frame 113 by a fluid motor or hydraulic ram 128 horizontally positioned above the plow beam 108. The fluid motor includes a horizontal cylinder 129 pivotally mounted for limited movement about a horizontal transverse axis on a support 131 extended upwardly from and secured to the beam 108. Slidably positioned in the cylinder 129 is a piston 132 secured to a rearwardly projected piston rod 133. A pin 134 pivotally connects the rear end of the piston rod to the upper portion of the upright bellcrank arm 121.

The cylinder 129 has a forwardly projected nipple 136 carrying one end of flexible hose 137. The opposite end of the hose 137 is positioned over a portion of a coupling 138 secured to the bottom of an upright cylinder 139. A support stand 141 secured to and projected upwardly from the plow beam 108 holds the cylinder 139 in an upright position. Slidably positioned in the cylinder 139 is a piston 142 biased in a downward direction by springs, gas under pressure or the like, to exert a substantially constant force on hydraulic fluid 143.

When the plowshare of the plow bottom 107 hits an obstruction the standard 109 first pivots upwardly about the pin 114. As the force on the plow bottom 107 increases the frame 113 pivots rearwardly and upwardly about the transverse pin 116. This movement of the standard urges the link 123 in an upward direction turning the bellcrank 116 clockwise so that the upright arm moves in a forward direction forcing the piston 132 into the cylinder 129. Rearward movement of the frame 113 rotates the bellcrank 119 as the stop 127 engages the bellcrank 119 further moving the piston 132 into the cylinder 129. The hydraulic fluid 143 flows through the flexible holes 137 into the coupling 138 and up into the large cylinder 139 against the piston 142 urging the same in an upward direction. The cylinder 129 being pivoted about a horizontal transverse axis on the support 131 angularly moves to keep the piston 132 and piston rod 133 in axial alignment with the cylinder 129 on movement of the bellcrank 119. The hose 137 being flexible permits limited angular movement of the cylinder 129.

As soon as the plow bottom 107 moves from the obstruction the piston 132 moves in a rearward direction. This rotates the bellcrank 119 in a counterclockwise direction forcing the link 123 downwardly which in turn rotates the standard 109 in a forward direction until the upright arm 111 engages the stop 118. When the bellcrank abuts against the stop 127 the frame 113 moves in a forward direction about pivot pin 116 until gusset plate 120 abuts against beam 108. The plow bottom is now in normal earth-working position.

Figure 7:
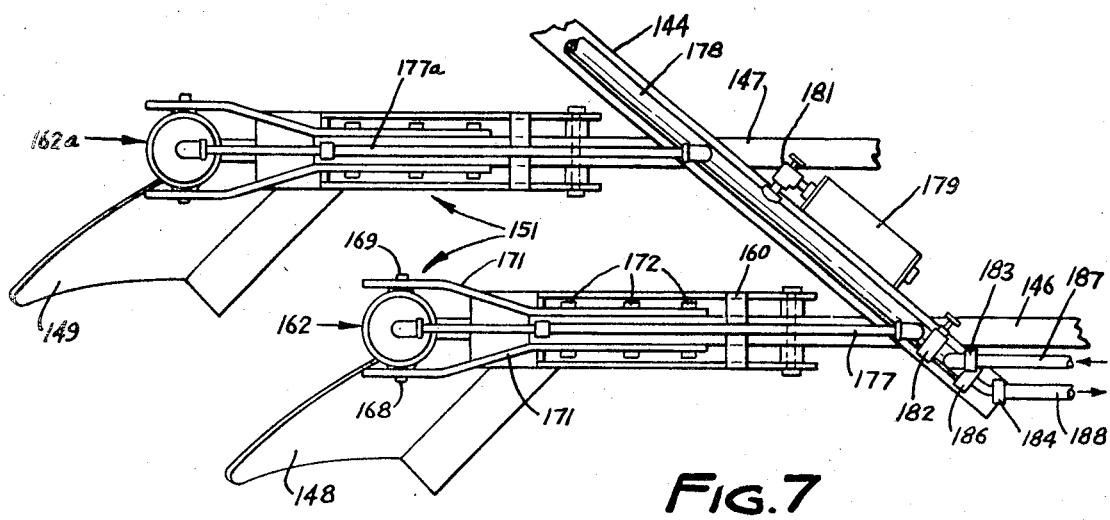
FIG. 7 is a fragmentary plan view of a multibottom plow equipped with a plow bottom holding and release system.

Referring to FIG. 7, there is shown a portion of a multibottom plow having a diagonal beam 144 attached to longitudinal plow beams 146 and 147. Plow bottoms 148 and 149 are attached to the ends of the beams by a plow bottom holding and release system indicated generally at 151.

Figure 8:
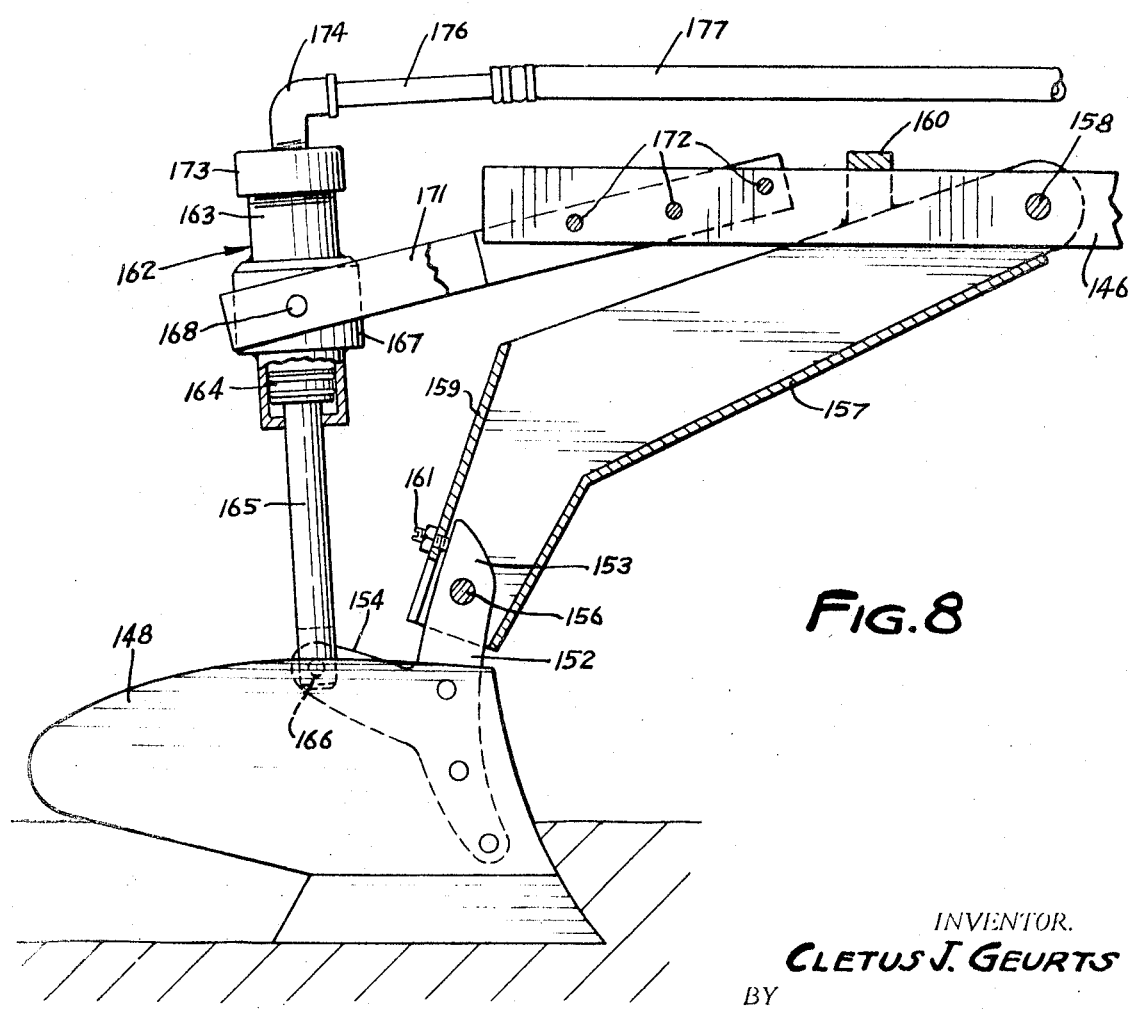
FIG. 8 is a side elevational view of one of the plow bottoms of FIG. 7 showing partly in section one unit of the plow bottom holding and release system.

Referring to FIG. 8, there is shown the structure for pivotally attaching the plow bottom 148 to the rear end section of the plow beam 146. The plow bottom 149 as well as other plow bottoms are similarly attached to their corresponding plow beams. An upright standard 152 having an upright arm 153 and a rearward arm 154 is secured to the plow bottom 148. A transverse pin 156 projects through the upright standard arm 153 and pivotally mounts the standard on the lower end of an angle frame 157 having a channel-shaped cross section open in rearward and upward directions. A transverse pin 158 pivotally connects the upper end of the beam 157 to the plow beam 146. The lower section of the frame 167 is enclosed with an upright web 159 carrying an adjustable stop 161. The forward portion of the stop 161 bears against the rearward portion of the upright arm 153. The forward rotation of the frame 157 is limited by an inverted U-shaped member 160 extended over the beam 146 and secured to the upright flanges of the frame 157. The U-shaped member 160 functions as a stop bearing against the top of the beam 146 to limit forward rotation of the frame 157.

A fluid motor or hydraulic ram indicated generally at 162 is used to yieldably hold the plow bottom 148 in the ground working position. The fluid motor 162 comprises an upright cylinder 163 carrying a piston 164 and piston rod 165. A transverse pin 166 pivotally connects the lower end of the piston rod 165 to the rearward standard arm 154. A sleeve 167 is positioned about and secured to the cylinder 163. The sleeve 167 has oppositely directed ears 168 and 169, shown in FIG. 7, which project through brackets 171 secured to the end of the plow beam 146 by bolt and nut assemblies 172. The brackets project rearwardly from the end of the beam on opposite sides of the sleeve 167.

The top end of the cylinder 163 is closed with a cap 173 having an elbow coupling 174. A pipe 176 projects forwardly from the coupling 174 and carries a flexible hose 177. As shown in FIG. 7, plow bottom 149 has a fluid motor 162a coupled to forwardly extended flexible hose 177a. Each additional plow bottoms have similar structure. The flexible hoses 177 and 177a are coupled to a common manifold pipe 178 secured to the top of the diagonal beam 144. An accumulator 179 carried on the beam 144 is fluidly connected to the manifold pipe 178 through a shutoff valve 181. The fluid motors 162 and 162a as well as the flexible hoses 177 and 178, the manifold pipe 178 and a portion of the accumulator 179 is filled with a hydraulic fluid, such as oil, and subjected to a high pressure of approximately 1,200 p.s.i. This is accomplished by charging the accumulator 179 with a gas, such as nitrogen, under high pressure. The accumulator 179 may be provided with a floating piston dividing the accumulator cylinder into a hydraulic chamber and a gas chamber.

The hydraulic fluid under high pressure may be supplied directly from the tractor used to pull and operate the plow. The forward end of the manifold pipe 178 has a shutoff valve 182 which is closed when the accumulator 179 is used to subject the hydraulic fluid in the system under pressure. A pair of quick release couplers 183 and 184 disposed on opposite sides of a pressure relief valve 186 are connected to the inlet of the shutoff valve 82. A delivery hose 187 and a return hose 188 are connected to the couplers 183 and 184, respectively. The pressure relief valve 186 is used to maintain the hydraulic pressure in the system at a substantially constant and high value. When the external source of fluid pressure is used the shutoff valve 181 is turned to the closed position to take the accumulator 179 out of the system. Valve 181 can be opened to use the tractor hydraulic system to recharge the accumulator 179.

In use, the hydraulic fluid under pressure biases the piston 164 of the fluid motor 162 in a downward direction forcing the standard arm 153 into engagement with the stop 162. The fluid motor also forces the frame 157 in a forward direction until the stop 160 engages the top of the plow beam 146. In this position the plow bottom 148 is in earth-working position. When the plow bottom strikes an obstruction the standard 152 will rotate rearwardly and upwardly about the pin 156 forcing the piston 164 up into the cylinder 163. This increases the hydraulic pressure in the system. As the plow bottom 148 rides over the obstruction the frame 157 rotates upwardly about the pin 158 further increasing the hydraulic pressure in the system. As soon as the plow bottom passes over the obstruction the fluid in the system being under pressure forces the piston 164 in a downward direction moving the frame 157 downwardly until the stop 160 abuts the top of the plow beam 146 and rotates the standard 152 in a forward direction until the upright standard arm 153 abuts the adjustable stop 161.

While there have been shown and described several preferred embodiments of the invention it will be understood that various omissions, substitutions and changes in form and details of the plow bottom release and holding mechanism may be made by those skilled in the art without departing from the spirit of the invention. The invention is to be limited only as indicated by the following claims.

I claim:

1. In an earth-working implement having a substantially horizontal beam the combination of: first link means pivotally connected to the rear end section of said beam and projected downwardly and rearwardly therefrom, first stop means secured to the lower section of said first link means, a generally upright standard pivotally mounted on the lower end of the first link means and engageable with the stop means, said standard having a rearwardly directed arm, an earth-working tool secured to the lower portion of said standard, said tool being in a ground-working position when said standard is in engagement with said stop means, second link means pivotally secured to the outer section of said arm and extended upwardly therefrom, a bellcrank member pivotally mounted to the rear end section of said beam, said bellcrank member having a rearwardly directed arm and an upwardly directed arm, second stop means mounted on the first link means engageable with the bellcrank member limiting downward movement of the bellcrank member relative to the first link means, means pivotally connecting the upper end of the second link means to the rear end section of the horizontal arm of said bellcrank member, a piston and a cylinder assembly having a cylinder supported on said beam and a piston pivotally connected to the upwardly directed arm of the bellcrank member applying a rearwardly directed force to said bellcrank member moving the rearwardly directed arm thereof and second link means in a downward direction holding the standard in engagement with said stop means thereby yieldably holding the tool in the normal ground-working position, and means for applying a substantially constant fluid pressure to said piston and cylinder assembly thereby holding said ground-working tool in the ground-working position, said means including a compressible means movable to allow the tool to move toward a release position when striking an obstruction.

2. The structure defined in claim 1 including:
 a. a second piston and cylinder assembly having a cylinder piston slidably positioned in said cylinder and spring means urging a piston to apply pressure to fluid connecting the first piston and cylinder assembly with the second piston and cylinder assembly.

3. In an earth-working implement having a horizontal beam the combination of: link means, support means mounted on the beam, means pivotally connecting the link means to a section of the support means for movement about an axis transverse of the implement, a generally upright standard pivotally connected to the link means for movement about an axis transverse of the implement, said standard having a rearwardly directed arm, stop means on said support means engageable with said standard to limit movement thereof, an earth-working tool mounted on said standard, said tool being in a normal ground-working position when said standard is in engagement with said stop means and a power unit for storing and transmitting force operable to bias the standard into engagement with the stop means, said power unit having a first cylinder, means pivotally connecting the first cylinder to said support means, a piston positioned in the first cylinder connected to a piston rod pivotally connected to said arm, a second cylinder mounted on and in fluid communication with the first cylinder, hydraulic fluid under pressure in said first and second cylinders biasing the piston to yieldably hold the standard in engagement with said stop means, said second cylinder being normally enclosed and the sole source of hydraulic fluid under pressure.

4. The structure defined in claim 3 wherein said power unit includes restrictor valve means located in the fluid flow path between said first and second cylinders for limiting the flow rate of hydraulic fluid from the second cylinder to the first cylinder.

5. The implement of claim 3 wherein the support means includes a pair of spaced upright plates secured to the beam.

6. The implement of claim 5 including coacting guide means on the standard and plates for directing the movement of the standard and tool in an upward and rearward direction whereby the tool moves from a ground-working position and a release position without allowing the tool to go below the ground-working position of the tool.

7. The implement of claim 6 wherein the coacting guide means comprises curved rails secured to the plates and roller means riding on the rails rotatably mounted on the standard.

8. The implement of claim 3 wherein: the stop means is adjustable whereby the attitude of the earth-working tool may be varied.

9. The implement of claim 3 wherein: the earth-working tool is a plow bottom.

10. In an earth-working implement having a beam, the combination of: longitudinally extended link means, support means connected to the beam, means pivotally connecting the link means to a section of the support means for generally up and down movements about an axis transverse of the implement, a generally upright standard pivotally connected to a rear portion of the link means for movement about an axis transverse of the implement, means engageable with said standard to limit the forward movement of the standard, an earth-working tool mounted on the lower portion of said standard, earth-working tool being in normal ground-working position when said standard is in engagement with the means to limit forward movement of the standard, power means connected to the standard for continuously storing and continuously transmitting force to bias the standard to a position wherein the earth working tool is in its forward normal ground-working position, said power means having a first hydraulic cylinder pivotally connected to the standard, said first cylinder having relatively movable members, one of said members being connected to the standard, means connecting the other of said members to said support means, a second cylinder in fluid communication with and connected to the first cylinder, hydraulic fluid under pressure in said first cylinder and second cylinder providing a hydraulic link between said cylinders providing a biasing force on the first cylinder to continuously and yieldably hold the earth-working tool in its normal earth working position, said second cylinder being normally enclosed and the sole source of hydraulic fluid under pressure, and restrictor means in the flow path between the first and second cylinders for limiting the flow rate of hydraulic fluid from the second cylinder to the first cylinder and allowing substantially unrestricted flow of hydraulic fluid from the first cylinder to the second cylinder.

11. In a plow, the combination of: a plow beam, a plow bottom, and interconnecting means normally holding said plow bottom in a forward lower ground-working position and permitting movement of said plow bottom to an upper rearward displaced position, said interconnecting means comprising link means, support means connected to the be[m, fiqst sq[ns-verse pivot means connecting a forward portion of said link means to said support means for swinging movement about a generally first transverse axis, a standard, means rigidly securing said plow bottom to a lower portion of said standard, second pivot means interconnecting a portion of said standard to a rear portion of said link means to permit rearward swinging movement of said standard about a generally second transverse axis, said second axis being longitudinally spaced from the first axis, continuously acting hydraulic means connected to the standard and beam to yieldably hold the plow bottom in its forward ground-working position, said hydraulic means being yieldable to permit upward and rearward movement of said plow bottom from its normal working position and acting to reset the plow bottom after it has been tripped, said hydraulic means comprising a first member pivotally connected to the standard and a second member movable relative to the first member and mounted on the support means, means including a pivot to pivotally connect the second member to the support means, said hydraulic means being located generally above said standard, an independent and normally closed source of hydraulic fluid under pressure connected to the hydraulic means, and restrictor means in the flow path between hydraulic means and source of hydraulic fluid under pressure for limiting the flow rate of hydraulic fluid from the source of hydraulic fluid to the hydraulic means and allowing substantially unrestricted flow of hydraulic fluid from the hydraulic means back toward the source of hydraulic fluid under pressure.

12. The plow of claim 11 including: stop means on the support means for limiting forward movement of the standard, said stop means being adjustable to vary the attitude of the plow bottom.

* * * * *

PO-1050
(5/69)

UNITED STATES PATENT OFFICE
CERTIFICATE OF CORRECTION

Patent No. 3,642,074          Dated February 15, 1972

Inventor(s) Cletus J. Geurts

It is certified that error appears in the above-identified patent and that said Letters Patent are hereby corrected as shown below:

Column 8, line 12, before "earth-working" insert --said--.

Column 8, line 40, "be[m, fiqst sq[ns-" should be --beam, first trans- --.

Signed and sealed this 21st day of November 1972.

(SEAL)
Attest:

EDWARD M. FLETCHER, JR.           ROBERT GOTTSCHALK
Attesting Officer          Commissioner of Patents